Oct. 1, 1946. H. A. HUSTED Re 22,796
COMBINATION FAN AND EYESHIELD
Original Filed April 28, 1945
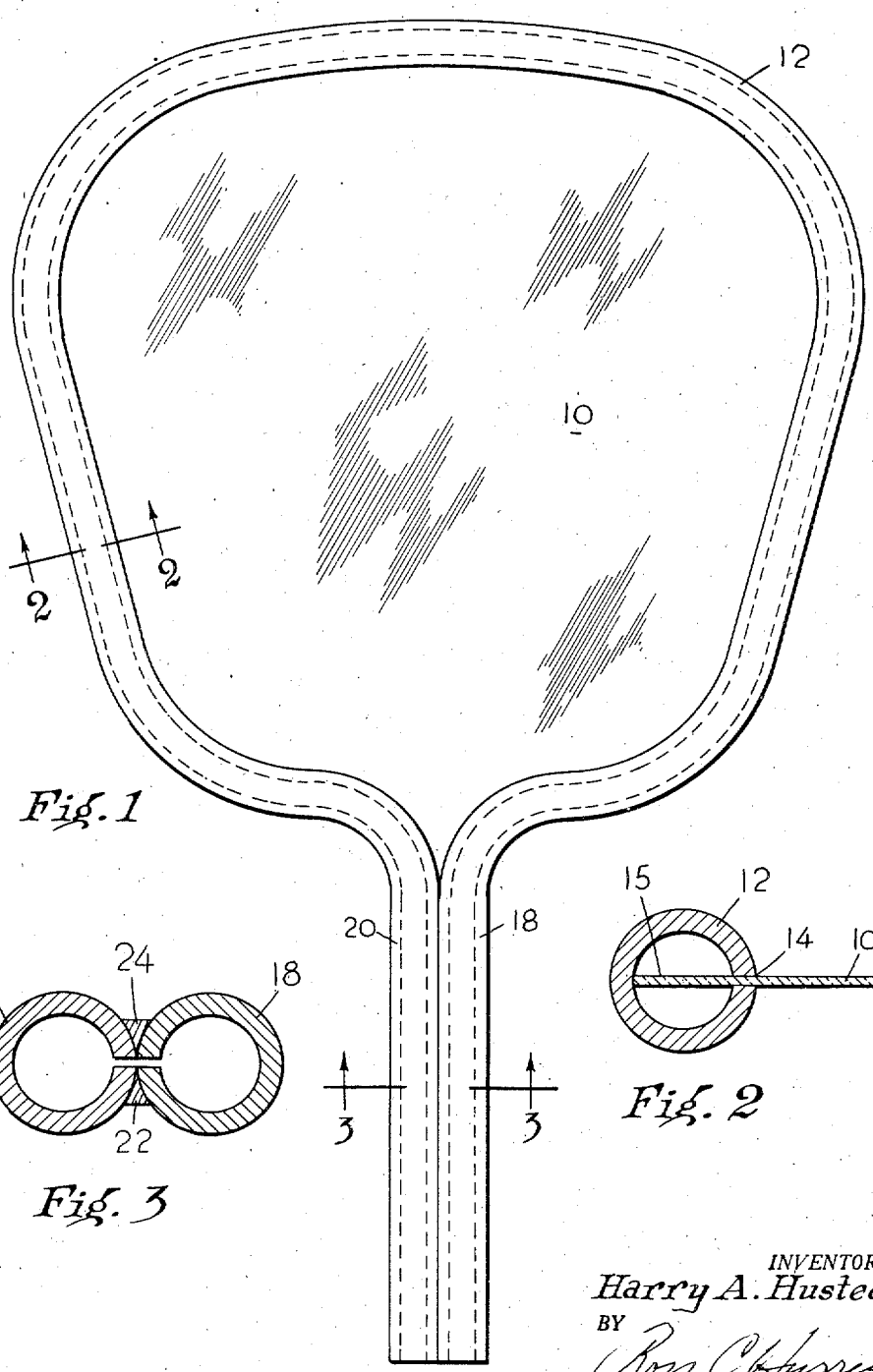
Fig. 1
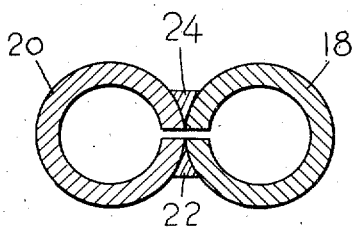
Fig. 3
Fig. 2
INVENTOR.
Harry A. Husted
BY
Ross Osburn Reissued Oct. 1, 1946

Re. 22,796

UNITED STATES PATENT OFFICE 22,796

COMBINATION FAN AND EYESHIELD

Harry A. Husted, St. Clair, Mich.

Original No. 2,392,671, dated January 8, 1946, Serial No. 590,804, April 28, 1945. Application for reissue May 17, 1946, Serial No. 670,334

5 Claims. (Cl. 230—266)

It is an object of this invention to provide an implement which will combine the properties of an ordinary hand fan with those of an eye shade.

It is a further object of this invention to provide a device as aforesaid which will be light in weight, rigid and durable, and which will be cheap and easy to manufacture.

The above and other objects will be made clear from the following detailed description taken in connection with the annexed drawing in which:

Figure 1 is a plan view of the completely assembled device;

Fig. 2 is a section on the line 2—2 of Fig. 1; and

Fig. 3 is a section on the line 3—3 of Fig. 1.

The device comprises a sheet of relatively transparent plastic 10 which is cut to a fan shape. A length of tubing 12 is slotted at 14 throughout its entire length and is bent to surround the sheet 10 and to receive the margins 15 of the sheet 10 through the slot 14. The length of the tube 12 exceeds the perimeter of the sheet 10 so that two excess lengths 18 and 20 are provided. These are brought together to form a handle, and the arrangement is such that the slots 14 in sections 18 and 20 face each other, as best shown in Fig. 3. The sections 18 and 20 are cemented as shown at 22 and 24 in Fig. 3, so as to make a permanent assembly of the tube 12 and the sheet 10.

The sheet 10 is transparent, in the sense that one may see through it with perfect clarity, and may be formed of cellulose nitrate, cellulose acetate, or any of the polymers and copolymers of vinyl chloride and vinyl acetate, polymerized methyl methacrylate, various phenol-formaldehyde products, polymerized styrene, or, in fact, any plastic base that will transmit sufficient light for adequate visibility. The plastic making up the sheet 10 is, however, colored by the addition of any suitable dye which will exclude a sufficient proportion of the light and, particularly, of the undesirable rays of sunlight, to eliminate glare and eye strain. For example, the azo dyes, such as methyl orange, are particularly absorptive of ultra violet light.

Tube 12 could be made of light weight metal, but, both from the standpoint of cost and weight, it is preferred to use a tube of extruded plastic, such, for example, as cellulose acetate, which may be easily bent to a desired form. In protecting the edges of the sheet 10, the tube greatly reduces the inflammability of the sheet 10, and since it overlies a substantial width of margin of the sheet 10, it prevents distortion, or flexing, of the sheet, which depending on the nature of the sheet 10, might be optically undesirable. In the extrusion of a plastic tube, both internal and external cross sections can be given any desired shape, although the circular section illustrated in Figs. 2 and 3 is preferred as being more economical of material. The tube may be given any desired color, which may either match or be in contrast to the color of the sheet 10. The tube may, of course, range from completely transparent to completely opaque.

The combination of hand fan and eye shade has particular utility at sporting events where only occasionally is sun glare a factor. Under such circumstances, dark glasses, for example, are something of a nuisance since they are not constantly required. By the use of this invention, however, the eyes may be momentarily relieved, as the occasion demands, while the device at all times is competent to function as a fan.

I claim:

1. In a combination fan and eye shield comprising a relatively thin fan-shaped sheet of transparent material having the property of filtering objectionable light frequencies; an integral frame and handle secured to said sheet and comprising a continuous hollow tube of plastic material of length substantially greater than the periphery of said sheet and having a slot throughout its entire length substantially equal in width to the thickness of said sheet, said tube being of such shape as to completely surround said sheet, forming a rigid frame therefor; the margins of said sheet being received in said tube through said slot, and the excess length of said tube at its two ends extending substantially radially of said sheet in the plane thereof and being cemented together to form a handle.

2. In a combination fan and eye shield comprising a relatively thin fan-shaped sheet of transparent material having the property of filtering objectionable light frequencies; an integral frame and handle secured to said sheet and comprising a continuous hollow tube of plastic material of length substantially greater than the periphery of said sheet and having a slot throughout its entire length substantially equal in width to the thickness of said sheet, said tube being of such shape as to completely surround said sheet, forming a rigid frame therefor; the margins of said sheet being received in said tube through said slot, and the excess length of said tube at its two ends extending substantially radially of said sheet in the plane thereof and being cemented together in parallel relationship throughout the length thereof to form a handle, with the slotted portions of said ends abutting one another in face to face relation so as effectively to close and hide the slots.

3. In a combination fan and eye shield comprising a relatively thin fan-shaped sheet of transparent material having the property of filtering objectionable light frequencies; an integral frame and handle secured to said sheet and comprising a continuous hollow tube of length substantially greater than the periphery of said sheet and having a slot throughout its entire length substantially equal in width to the thickness of said sheet, said tube being of such shape as to completely surround said sheet, forming a rigid frame therefor; the margins of said sheet being received in said tube through said slot, and the excess length of said tube at its two ends extending substantially radially of said sheet in the plane thereof and being secured together to form a handle.

4. In a combination fan and eye shield comprising a relatively thin fan-shaped sheet of transparent material having the property of filtering objectionable light frequencies; an integral frame and handle secured to said sheet and comprising a continuous hollow tube of length substantially greater than the periphery of said sheet and having a slot throughout its entire length substantially equal in width to the thickness of said sheet, said tube being of such shape as to completely surround said sheet, forming a rigid frame therefor; the margins of said sheet being received in said tube through said slot, and the excess length of said tube at its two ends extending substantially radially of said sheet in the plane thereof and being secured together in parallel relationship throughout the length thereof to form a handle, with the slotted portions of said ends abutting one another in face to face relation so as effectively to close and hide the slots.

5. In a combination fan and eye shield comprising a relatively thin fan-shaped sheet of transparent material having the property of filtering objectionable light frequencies; an integral frame and handle secured to said sheet and comprising a continuous hollow metal tube of length substantially greater than the periphery of said sheet and having a slot throughout its entire length substantially equal in width to the thickness of said sheet, said tube being of such shape as to completely surround said sheet, forming a rigid frame therefor; the margins of said sheet being received in said tube through said slot, and the excess length of said tube at its two ends extending substantially radially of said sheet in the plane thereof and being secured together to form a handle.

HARRY A. HUSTED.